Patented July 7, 1936

2,046,811

UNITED STATES PATENT OFFICE 2,046,811

BASIC OPEN HEARTH STEEL PROCESS

Earnshaw Cook, Ruxton, Md., assignor to Bethlehem Steel Company, a corporation of Pennsylvania No Drawing. Application December 12, 1930,
Serial No. 501,924. Renewed December 4, 1935

3 Claims. (Cl. 75—54)

My invention is directed to a method for controlling the oxygen content of steel. More particularly, my invention relates to a method of controlling the oxygen content of steel in a basic open hearth process.

It is well known that excessive amounts of oxides in steels may act deleteriously. It is common practice at the end of a heat to add deoxidizing substances such as manganese, silicon, or aluminum either to the metal in the furnace or in the ladle to reduce the content of oxygen which is present in the form of iron oxide (FeO).

The iron oxide content of slag may vary greatly in different heats, even when producing substantially the same kind of steel. The following table sets forth the results of a large number of analyses of slags taken at the time at which the heats were ready for tapping. Following the designation in the first column of the kind of steel is given the average iron oxide content of the slag tested. Following this is given the lowest percentage found and the last figure represents the highest percentage found.

Tapping slags

| Kind of steel | Analyses average FeO | Percent minimum FeO | Percent maximum FeO |
|---|---|---|---|
| Rimmed steel | 22.0 | 16.1 | 28.2 |
| Plate steel | 18.0 | 11.0 | 25.7 |
| Low car—killed steel | 18.0 | 15.0 | 27.0 |
| Medium car—killed steel | 16.0 | 12.0 | 21.0 |
| High car—killed steel | 16.0 | 13.0 | 19.0 |

It will be evident from this table that the possible variations in the slag are very great.

A purpose of my invention is to control the oxygen content of the steel by controlling the iron oxide content of the slag. The higher the iron oxide content of the slag at or near the end of the heat the higher will be the content of iron oxide in the steel, other things, such as carbon, temperature and manganese contents, being equal. With a low iron oxide content of the slag it is possible to produce a steel which requires less deoxidation later. On the other hand, if the iron oxide content of the steel gets too low during the heat there is serious danger of the phosphorus content of the steel becoming too high. By my process I seek to so control the oxide content of the slag during the heat as to obtain an iron oxide content thereof between certain limits. Broadly, in my process the iron oxide content of the slag is controlled so as to obtain a content near the end of the heat low enough to avoid the disadvantage of excessive oxygen in steel and at the same time not so low an iron oxide content of the slag as to produce an objectionable content of phosphorus for the particular steel being produced.

In setting forth my invention it may be well to first give an outline of a particular heat to illustrate the invention.

A basic open hearth furnace was charged as follows: 18000 lbs. of limestone and 7000 lbs. of dolomite were charged upon the furnace hearth followed by 21000 lbs. of iron ore and 63000 lbs. of scrap. The furnace was then operated in the usual way to preheat the mass following which, 136,000 lbs. of "hot metal" were introduced. The hot metal contained silicon .80%, manganese 1.80% and phosphorus .32% while the scrap contained silicon .30% and phosphorus .05%. The heat was conducted in the customary way until the limestone was completely "melted". The operation as thus conducted was in no way different from the usual practice. From this time on tests were made upon the slag and upon the metal of the bath and additions made to the slag to effect the control in accordance with my invention.

The first analysis of the steel during the heat showed a carbon content of .52%, a manganese content of .17% and a phosphorus content of .018%. At the same time the slag was found to contain 16.2% iron oxide, 19.1% silicon dioxide and 43.1% calcium oxide. A short time after these determinations 2000 lbs. of sand, consisting principally of silica, and 1500 lbs. of lime were added to the slag. About 45 minutes later determinations were again made of the steel and the slag. It was found that the carbon content of the steel had dropped to .20%, while the manganese content had changed to .23% and the phosphorus content increased to .022%. At the same time the slag showed iron oxide 12.1%, silicon dioxide 24.4% and calcium oxide 44.8%. It will be evident from this that the composition of the slag so far as its lime is concerned is not greatly altered; the silica on the other hand is greatly increased while the iron oxide has somewhat decreased. As to the steel, it will be evident that there has been a very substantial drop in the carbon content.

Immediately following these determinations 1000 lbs. of silicious sand and 1500 lbs. of lime were added. One-half hour later the carbon content of the metal was found to have dropped to .10%, the manganese content to .21% and the phosphorus had changed to .025%. At the same time the slag was found to contain 11.8% iron oxide, 26.4% silicon dioxide, and 45.2% calcium oxide. It will be readily apparent from this that there has been an appreciable drop in the carbon content of the metal, a moderate drop in the iron oxide content of the slag, a moderate increase of the silica content of the slag while the lime content of the slag has not greatly altered.

Analyzing the above it will be apparent that by the addition of silicious material it has been possible to lower the iron oxide content of the slag with a diminishing content of carbon in the metal bath. This diminishing content of iron oxide in the slag with diminishing content of carbon in the steel is noteworthy in view of the fact that ordinarily in conducting the open hearth process the iron oxide content of the slag increases with diminishing carbon content. In view of the fact that the iron oxide in the metal bears a relationship to the amount of iron oxide in the slag it will be readily apparent that it is possible to produce steel having a lesser oxide content by so treating the slag as to prevent the normal rise in iron oxide content of the slag with diminishing carbon content of the steel bath.

While in the above example the iron oxide content of the slag has diminished during the heat, it does not necessarily follow that it is essential that the oxide content actually diminish numerically through the process. Normally, as the carbon content of the metal bath diminishes during the heat the percentages of iron oxide in the metal and in the slag increase. Silicious material may be added to the slag during the heat to control the amount of iron oxide in the slag, and thereby in the metal, without necessarily reducing the percentage of iron oxide in the slag at a later stage of the heat when there may be a considerably reduced carbon content of the metal. The percentage of iron oxide at the end of the heat, for example, may even be higher than the percentage of this substance at the time of the silica addition. But by virtue of the silicious material addition the percentage of iron oxide is lower near the end of the heat than it would have been but for the addition of the silicious material. The important thing is to so control the oxide content of the slag as to have it at about the desired figure at the time at which the metal is ready for tapping or for the addition of deoxidizing agents such as manganese and the like. This may be illustrated by considering the following heat.

At one stage of the heat the slag was analyzed and found to contain silicon dioxide 19.20%, iron oxide 11.45% and calcium oxide 45.45%, while the steel at the same time contained carbon .27%, manganese .19% and phosphorus .032%. Sand and lime were then added following which, after a moderate period of time, the slag was found to contain silicon dioxide 16.00%, iron oxide 14.02% and calcium oxide 48.49%; the metal in the steel at the same time containing carbon .13%, manganese .20% and phosphorus .014%. Here there has been a substantial rise in the iron oxide content of the slag with dropping carbon content but in virtue of the additions of silicious material it has been possible to prevent the iron oxide rising as high as would normally occur for the particular carbon content of the steel shown by the second analysis.

It will be readily apparent that by my method it is possible to add silica to obtain an iron oxide content of the slag less than that which would normally be present for the particular carbon content of the steel. In practice there is usually a limit to the diminution of oxide content permissible. When the iron oxide content of the slag becomes too low with corresponding lowering of the oxide content of the metal, there is danger of increasing the phosphorus content of the metal above a permissible percentage. The lower the oxide content of the metal the greater the tendency toward increase of phosphorus content of the metal, other things being equal. Consequently in carrying out my process there is a practical limit for the lowering of the oxide content of the slag, which lower limit is dependent upon the amount of phosphorus permissible in the metal. Thus it is an important aspect of my invention to control the iron oxide content of the slag within limits. Thus the aim will always be to obtain the oxide as low as possible near the end of the heat without allowing the iron oxide content to fall during the heat to such a percentage as would cause too great a phosphorus content of the steel.

It will have been noted that lime was added as well as silica to the slag in the heats above mentioned. The amount of lime added obviously depends upon the percentage which it is desired to have present in the slag after the silica addition. If the calcium oxide content is satisfactory before the silica addition the lime added may be just sufficient to maintain the percentage of calcium oxide substantially constant. If it is desired to change the basicity of the slag obviously the lime addition will be greater or less.

Heats have been successfully controlled in accordance with my invention where silica alone has been added.

While the control of the oxide content of the slag, as above exemplified, has involved the addition of silica to cause the iron oxide content to become less than it otherwise would be for the particular carbon content, the control may be in a reverse direction, that is the slag may be treated to cause an increase of oxide content to keep the phosphorus below a particular figure. In other words, my invention in its broader aspects includes the idea of either increase or decrease of iron oxide content depending upon the desired iron oxide content of the slag.

Accordingly, instead of adding silica, it may be useful at times to add iron oxide. At such times it is important to add the oxide in some form which is readily soluble in the slag. A desirable form I have found to be roll scale.

Commonly it is advisable not to allow the iron oxide content to become appreciably less than 12% during the heat. If substantially less than this amount is present in the slag it will usually cause the introduction of undesirable amounts of phosphorus in the steel. Of course when the raw material such as the scrap and the hot metal contain unusually small amounts of phosphorus, or when it is not essential that the steel which is being produced shall contain a low phosphorus content, it may be expedient to go considerably lower than 12% iron oxide in the slag. Also when unusually low phosphorus contents are desired in the steel, or when unusually high phosphorus contents are present in the raw materials the minimum percentage of iron oxide in the slag may be higher than 12%. It is possible to obtain a very low oxygen content of the steel at time of tapping if the danger of introducing phosphorus from the slag be removed by suitable practice. For example, if the heat be conducted in a tilting furnace and the first slag be poured off and a major amount of the phosphorus originally present thus be removed it is then possible to control the slag by silicious additions, as above pointed out, in such amount as to produce a slag at time of tapping very low in iron oxide content, without danger of excessive phosphorus in the metal.

The significant thing is to so control the iron oxide content of the slag as to maintain it above such a figure as to prevent excessive amounts of phosphorus entering the steel, that is excessive for the particular steel which is involved, and also to get the iron oxide as low in the slag, at the time of tapping, as is possible subject to this limitation due to phosphorus.

If during the heat the slag shows an iron oxide content less than the minimum permissible, 12% in the usual case, roll scale and burned lime are added to the slag whereby the iron oxide content is increased, the lime preferably being added in sufficient amount to somewhat increase the basicity of the slag.

Where in the above examples reference is made to silicon dioxide, iron oxide and calcium oxide in the slags, it is obvious that these expressions are used in the ordinary sense where referring to analyses of complex mixtures such as slags, it not being intended by these expressions to convey any idea as to the actual chemical form in which these substances occur in the slag. For example where it is stated that the slag contains 45.45% of calcium oxide it is not meant that the slag necessarily contains calcium oxide in this amount out of chemical combination with other ingredients of the slag.

Substantial advantages accrue from my process. The lower the oxide content of the steel at tapping the less the amount of deoxidizing material required. The economy effected will be readily apparent. Furthermore the lesser amount of deoxidizing agents employed means cleaner steel, which necessarily mean steel which is better both internally and externally.

Having thus described my invention what I claim and desire to secure by Letters Patent is:

1. In a basic open hearth steel process, the steps of determining the iron oxide content of the slag during the heat and in accordance with such determination adding silicious material to the slag, said silicious material containing a greater proportion of silica than the proportion of silica in the slag, to obtain a lesser iron oxide content of the slag near the end of the heat out of proportion to the dilution effect of such addition.

2. In a basic open hearth steel process, the step of adding lime and silicious material to the slag during the heat, the ratio of the silica in the silicious material to the lime being greater than the proportion of silica in the slag, to lower the oxide content of the metal near the end of the heat out of proportion to the dilution effect of such addition.

3. In a basic open hearth steel process, the steps of making additions of silicious materials to the slag during the heat in amount to produce a slag having an iron oxide content between certain predetermined limits near the end of the heat, said silicious material containing a higher proportion of silica than the proportion of silica in the slag to which it is added.

EARNSHAW COOK.